United States Patent
Park et al.

(10) Patent No.: US 10,333,124 B2
(45) Date of Patent: Jun. 25, 2019

(54) SEPARATOR FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jong-Hwan Park, Yongin-si (KR); Byeong-Gyu Cho, Yongin-si (KR); Hyung-Bae Kim, Yongin-si (KR); Eun-Gyeong Lee, Yongin-si (KR); Jin-Hyuk In, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 131 days.

(21) Appl. No.: 14/930,533

(22) Filed: Nov. 2, 2015

(65) Prior Publication Data

US 2016/0149189 A1  May 26, 2016

(30) Foreign Application Priority Data

Nov. 21, 2014  (KR) .......................... 10-2014-0163794

(51) Int. Cl.
*H01M 2/16* (2006.01)
*H01M 10/0525* (2010.01)

(52) U.S. Cl.
CPC ....... *H01M 2/1686* (2013.01); *H01M 2/1653* (2013.01); *H01M 10/0525* (2013.01); *H01M 2220/20* (2013.01); *Y02E 60/122* (2013.01)

(58) Field of Classification Search
CPC ................................................ H01M 2/1686
See application file for complete search history.

(56) References Cited

U.S. PATENT DOCUMENTS

| 6,150,455 | A | * | 11/2000 | Takamiya | .............. H01B 1/122 428/522 |
| 8,513,349 | B2 | | 8/2013 | Ootsuka et al. | |
| 2006/0058462 | A1 | | 3/2006 | Kim et al. | |
| 2006/0222952 | A1 | * | 10/2006 | Kono | .................... H01M 4/136 429/231.95 |
| 2007/0128512 | A1 | * | 6/2007 | Kaimai | .................. B01D 69/12 429/144 |
| 2014/0186680 | A1 | * | 7/2014 | Kim | .................... H01M 2/1646 429/144 |

(Continued)

FOREIGN PATENT DOCUMENTS

| KR | 10-2004-0078927 A | 9/2004 |
| KR | 10-2012-0006667 A | 1/2012 |

(Continued)

OTHER PUBLICATIONS

Definitions (Year: 2018).*

*Primary Examiner* — Sarah A. Slifka
*Assistant Examiner* — Brian R Ohara
(74) *Attorney, Agent, or Firm* — Lewis Roca Rothgerber Christie LLP

(57) ABSTRACT

A separator for a rechargeable lithium battery includes: a substrate; and a coating layer on at least one side of the substrate, the coating layer including an acrylic-based copolymer obtained from polymerization of a (meth)acrylate salt and (meth)acrylonitrile, and a polyvinyl alcohol-based compound. A rechargeable lithium battery including the separator is also provided.

11 Claims, 2 Drawing Sheets

(56) References Cited

U.S. PATENT DOCUMENTS

2014/0295170 A1     10/2014  Kim et al.
2015/0099156 A1 *    4/2015  Suzuki ................ H01M 2/1653
                                                    429/144

FOREIGN PATENT DOCUMENTS

KR          10-1148564 B1    5/2012
KR      10-2013-0048843 A    5/2013

* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2014-0163794 filed in the Korean Intellectual Property Office on Nov. 21, 2014, the entire content of which is incorporated herein by reference.

BACKGROUND

1. Field

A separator for a rechargeable lithium battery and a rechargeable lithium battery including the same are disclosed.

2. Description of the Related Art

A rechargeable lithium battery includes a positive electrode, a negative electrode and a separator interposed between the positive and negative electrodes. The separator includes micropores, and thus, the separator including the micropores plays a role of electrically insulating the positive and negative electrodes from one another as well as providing a passage for movement of lithium ions. In addition, the separator shuts down the battery when the battery temperature exceeds a set or predetermined temperature, and thus, plays a role of preventing the battery from being overheated (or plays a role of reducing a likelihood or amount of such overheating).

The separator should be thinner and lighter as a high power/large capacity battery has recently been used for an electric vehicle and the like, and concurrently, the separator should have excellent thermal shape stability to produce a high-capacity battery.

For this purpose, a separator obtained by coating a binder resin and a ceramic particle on a porous substrate has been used. However, the separator is contracted when the battery is overheated, and thus, may hardly secure the thermal stability.

SUMMARY

One embodiment provides a separator for a rechargeable lithium battery having improved thermal safety.

Another embodiment provides a rechargeable lithium battery including the separator for a rechargeable lithium battery.

One embodiment provides a separator for a rechargeable lithium battery including: a substrate; and a coating layer on at least one side of the substrate, the coating layer including an acrylic-based copolymer obtained from polymerization of a (meth)acrylate salt and (meth)acrylonitrile, and a polyvinyl alcohol-based compound.

The (meth)acrylate salt may include an alkali metal, an alkaline-earth metal, ammonium, an amine salt, or a mixture thereof.

The acrylic-based copolymer may be formed by polymerizing about 30 to about 90 wt % of the (meth)acrylate salt and about 10 to about 70 wt % of the (meth)acrylonitrile, based on the total weight of the (meth)acrylate salt and the (meth)acrylonitrile.

The acrylic-based copolymer may have a viscosity ranging from about 500 cps to about 10,000 cps.

The polyvinyl alcohol-based compound may include polyvinyl alcohol, modified polyvinyl alcohol, or a mixture thereof.

The coating layer may include about 75 to about 99.5 wt % of the acrylic-based copolymer and about 0.5 to about 25 wt % of the polyvinyl alcohol-based compound, based on the total weight of the coating layer.

The coating layer may further include an inorganic particle, and the inorganic particle may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), clay, a glass powder, or a mixture thereof.

The coating layer may further include a dispersing agent, and the dispersing agent may include another acrylic-based compound that is different from the acrylic-based copolymer.

The dispersing agent may be included in an amount of about 0.1 to about 5 parts by weight based on 100 parts by weight of the inorganic particle.

The coating layer may be about 1 μm to about 7 μm thick.

The separator may have a shrinkage ratio of less than or equal to about 5% calculated according to the following Equation 1.

$$\text{Shrinkage ratio (\%)} = [(L0-L1)/L0] \times 100 \quad \text{Equation 1}$$

In Equation 1, L0 is the initial length of the separator, and L1 is the length of the separator after being allowed to stand at 130° C. for 1 hour.

Another embodiment provides a rechargeable lithium battery including the separator.

Other embodiments are included in the following detailed description.

The separator may be applied to realize a rechargeable lithium battery having excellent thermal safety.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
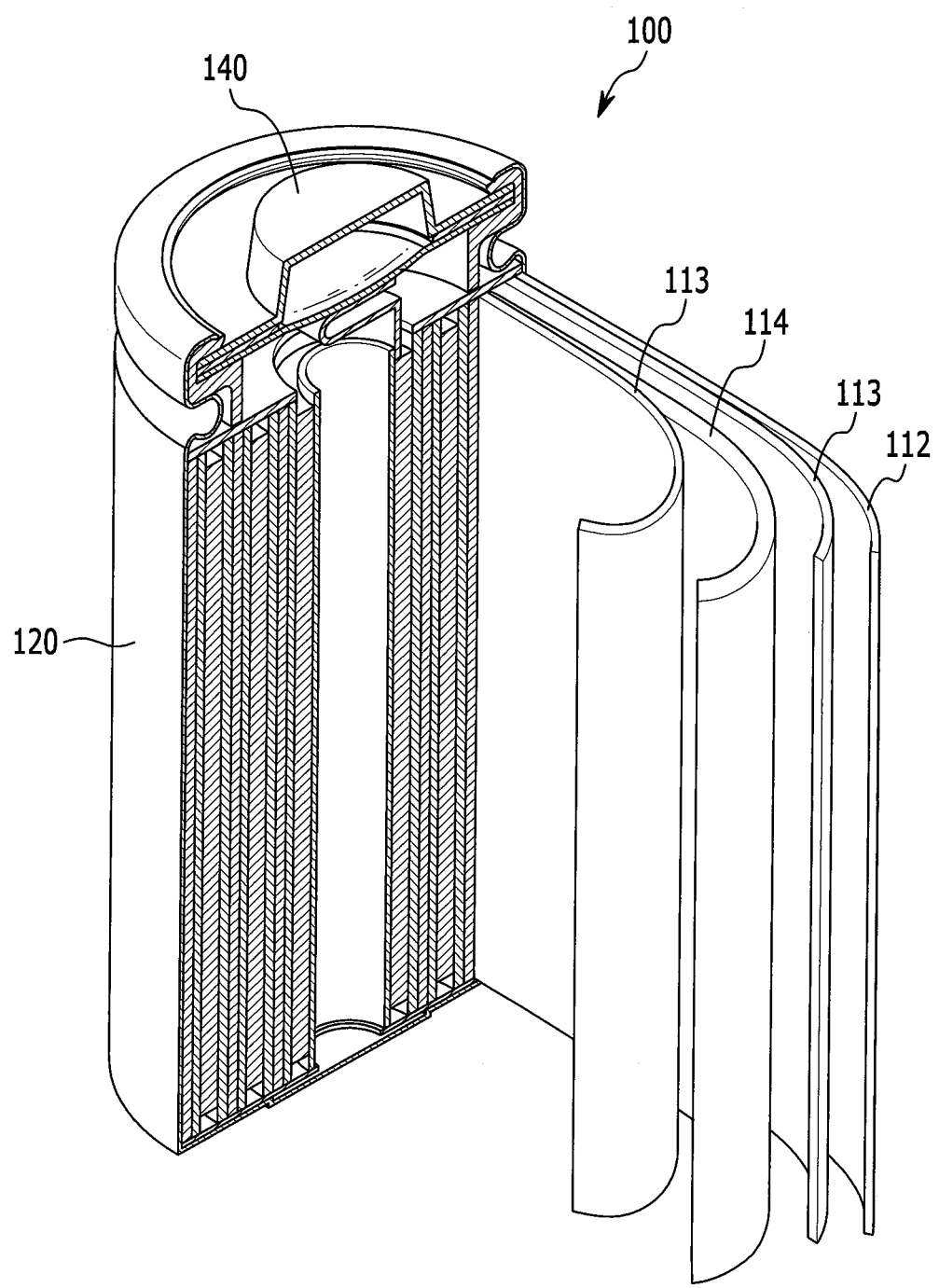
FIG. 1 is a schematic view showing a rechargeable lithium battery according to one embodiment.

Hereinafter, certain embodiments of the present disclosure are shown and described in detail, by way of illustration. However, these embodiments are exemplary, and this disclosure is not limited thereto. As those skilled in the art would recognize, the invention may be embodied in many different forms. Also, in the context of the present application, when a first element is referred to as being "on" a second element, it can be directly on the second element or be indirectly on the second element with one or more intervening elements interposed therebetween.

Hereinafter, a separator for a rechargeable lithium battery according to one embodiment is described.

The separator for a rechargeable lithium battery according to one embodiment separates a negative electrode from a positive electrode and provides passages for transfer of lithium ions, and includes a substrate and a coating layer positioned on at least one side of the substrate.

The coating layer may include an acrylic-based copolymer and a polyvinyl alcohol-based compound as a binder. When the acrylic-based copolymer and the polyvinyl alcohol-based compound are used as a binder to form a coating layer on a substrate, stability and reliability of the separator may be secured by reducing or minimizing the moisture content of the coating layer. Concurrently, thermal stability of the separator may be improved by preventing shrinkage and rupture of the separator at a high temperature (or by reducing a likelihood or amount of such shrinkage and rupture), and thus, ignition or explosion of the separator may be prevented (or a likelihood of ignition or explosion may be reduced).

The acrylic-based copolymer may be an acrylic-based copolymer obtained from polymerization of a (meth)acrylate salt and (meth)acrylonitrile.

Since the acrylic-based copolymer may increase a contact point with an inorganic particle described below, cohesion of the inorganic particle may be improved and dispersion of the inorganic particle may be increased, and thus, the separator may be prevented from shrinkage at a high temperature (or a likelihood or amount of such shrinkage may be reduced, thereby securing excellent heat resistance and oxidation resistance of the separator. In addition, the acrylic-based copolymer may not only improve adherence of the coating layer to a substrate but it may also decrease a moisture content in the coating layer due to the presence of a hydrophobic functional group.

The (meth)acrylate salt may be a salt compound of acrylic acid, methacrylic acid, or a mixture of combination thereof. Herein, the (meth)acrylate salt may be a salt compound including an alkali metal (an alkali metal salt), an alkaline-earth metal (an alkaline-earth metal salt), ammonium (an ammonium salt), an amine salt, or a mixture or combination thereof. Examples of the (meth)acrylate salt may include sodium acrylate, sodium methacrylate, magnesium acrylate, magnesium methacrylate, ammonium acrylate, ammonium methacrylate and the like, but the present invention is not limited thereto.

The (meth)acrylonitrile may include acrylonitrile, methacrylonitrile, or a mixture or combination thereof.

The acrylic-based copolymer may be formed by polymerization of about 30 to about 90 wt % of the (meth)acrylate salt and about 10 to about 70 wt % of the (meth)acrylonitrile, for example, from polymerization of about 30 to about 50 wt % of the (meth)acrylate salt and about 50 to about 70 wt % of the (meth)acrylonitrile, based on the total weight of the (meth)acrylate salt and the (meth)acrylonitrile. The acrylic-based copolymer obtained by polymerizing two kinds of monomers within the foregoing ratio has improved heat resistance and may secure a separator having excellent thermal stability.

The acrylic-based copolymer may have viscosity of about 500 cps to about 10,000 cps, for example, about 3,000 cps to about 6,000 cps. When the acrylic-based copolymer has a viscosity within the foregoing range, heat resistance of the separator is improved, and thus, a separator having excellent thermal stability may be secured. Herein, a reference solvent for measuring the viscosity is mineral oil (KS1000 & 5000) as a viscosity-based standard solution for correction.

The acrylic-based copolymer may be included in the coating layer in an amount of about 75 to about 99.5 wt %, for example, about 85 to about 95 wt %, based on the total amount or weight of the coating layer (e.g., based on the total amount or weight of the acrylic-based copolymer and the polyvinyl alcohol-based compound). When the acrylic-based copolymer is used within the foregoing range, heat resistance of the separator is improved, and thus, a separator having excellent thermal stability may be secured.

The polyvinyl alcohol-based compound may be polyvinyl alcohol, modified polyvinyl alcohol, or a mixture or combination thereof.

When the polyvinyl alcohol-based compound is used along with the acrylic-based copolymer, the polyvinyl alcohol-based compound is cross-linked with the acrylic-based copolymer, and thus, heat resistance of the separator may be improved, and a moisture content of the separator may be decreased through a dehydration reaction due to the cross-linking.

The modified polyvinyl alcohol may be polyvinyl alcohol modified to include a functional group such as a carboxyl group, a sulfonic acid group, an amino group, a silanol group, a thiol group, and/or the like.

The polyvinyl alcohol-based compound may be included in the coating layer in an amount of about 0.5 to about 25 wt %, for example, about 5 to about 15 wt %, based on the total amount or weight of the coating layer (e.g., based on the total amount or weight of the acrylic-based copolymer and the polyvinyl alcohol-based compound). When the polyvinyl alcohol-based compound is used within the foregoing range, heat resistance of the separator may be improved, and a moisture content of the coating layer may be decreased.

The coating layer may further include a styrene-butadiene rubber (SBR), carboxylmethyl cellulose (CMC), ethylene vinylacetate (EVA), hydroxyethyl cellulose (HEC), polyvinylbutyral (PVB), an ethylene-acrylic acid copolymer, acrylonitrile, vinyl acetate derivative, polyethylene glycol, an acryl-based rubber, or a mixture or combination thereof, other than (or in addition to) the acrylic-based copolymer and the polyvinyl alcohol-based compound as a binder.

The coating layer may further include an inorganic particle other than (or in addition to) the above binders. When the inorganic particle is further included in the coating layer, a short circuit between positive and negative electrodes may be suppressed by preventing thermal shrinkage of a separator (or by reducing a likelihood or amount of such shrinkage), and in addition, battery performance may be improved by reducing or minimizing resistance of lithium ions.

The inorganic particle may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), clay, a glass powder, or a mixture or combination thereof.

In order to increase dispersion of the inorganic particle into water, the coating layer may further include a dispersing agent.

The dispersing agent may be an acrylic-based compound. Herein, the acrylic-based compound may be a different compound from the above acrylic-based copolymer used as a binder.

The dispersing agent may be included in the coating layer in an amount of about 0.1 to about 5 parts by weight, for example, in an amount of about 0.1 to about 1 part by weight, based on 100 parts by weight of the inorganic particle. When the dispersing agent is used within the foregoing range, inorganic particles may be uniformly dispersed in the coating layer, and thus, a separator having excellent thermal stability may be secured.

The coating layer may be about 1 μm to about 7 μm thick, for example, about 2 μm to about 4 μm thick. When the coating layer has a thickness within the foregoing range, the separator may not only have excellent adherence to an electrode plate but also a reduced or minimum thermal shrinkage, and thus, a rechargeable lithium battery having excellent thermal safety may be obtained.

The substrate may have a porous structure including pores. Lithium ions are transferred through the pores. The substrate may include polyolefin such as polyethylene, polypropylene, or the like, polyester, polytetrafluoroethylene (PTFE), a glass fiber, or a combination thereof. The substrate may include a non-woven fabric or a woven fabric. The substrate may have a single layer structure or a multilayer structure. For example, the substrate may include a polyethylene single layer, a polypropylene single layer, a polyethylene/polypropylene double layer, a polypropylene/polyethylene/polypropylene triple layer, polyethylene/polypropylene/polyethylene triple layer, or the like. The substrate may have a thickness of about 1 μm to about 40 μm, for example, about 1 μm to about 30 μm, about 1 μm to about 20 μm, about 5 μm to about 15 μm, or about 5 μm to about 10 μm. When the substrate has a thickness within the foregoing range, a short circuit between positive and negative electrodes may be prevented (or a likelihood or amount of such a short circuit may be reduced), while internal resistance of a battery is not increased or not substantially increased.

The coating layer may be formed by coating a coating composition including the acrylic-based copolymer, the polyvinyl alcohol-based compound, the inorganic particle, the dispersing agent and deionized water on at least one side of the substrate and drying the coating composition.

The coating composition may be coated on the substrate using a dip coating method, a die coating method, a roll coating method, a comma coating method, or the like, but the present invention is not limited thereto.

The drying may include drying using warm air, hot air, or low humidity air or vacuum-drying, but the present invention is not limited thereto.

The separator may have a shrinkage ratio of less than or equal to about 5% obtained according to the following Equation 1.

Shrinkage ratio (%)=[(L0−L1)/L0]×100    Equation 1

In Equation 1, L0 indicates the initial length of the separator, and L1 indicates the length of the separator after being allowed to stand at 130° C. for 1 hour.

Hereinafter, a rechargeable lithium battery including the separator is described referring to FIG. 1.

FIG. 1 is a schematic view showing a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the negative electrode 112 and the positive electrode 114, an electrolyte solution impregnating the positive electrode 114, the negative electrode 112, and the separator 113, a battery case 120 housing the electrode assembly, and a sealing member 140 sealing the battery case 120.

The separator 113 is the same or substantially the same as described above.

The positive electrode 114 includes a current collector and a positive active material layer formed on the current collector.

The current collector may include aluminum, but is not limited thereto.

The positive active material layer includes a positive active material.

The positive active material may be a compound (lithiated intercalation compound) being capable of intercalating and deintercallating lithium such as, for example, a lithium metal oxide.

The lithium metal oxide may include at least one metal selected from cobalt, manganese, nickel and aluminum, and lithium. For example, compounds represented by any one of the following chemical formulae may be used.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α≤2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}M_nX_cO_{2-\alpha}T_\alpha$ (0.90≤a≤1.8, 0≤b≤0.5, 0≤c≤0.05, 0<α≤2); $Li_aNi_{1-b-c}Mn_bX_cO_{2-\alpha}T_2$ (0.90≤a≤1.8, 0≤b≤0.5, 0≤c≤0.05, 0<a<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the foregoing chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The lithium metal oxide may include, for example, a lithium nickel cobalt manganese oxide, a lithium nickel cobalt aluminum oxide, or a mixture or combination thereof, and among them, a mixture of the lithium nickel cobalt manganese oxide and the lithium nickel cobalt aluminum oxide may be used.

The positive active material layer includes a binder and a conductive material in addition to the positive active material.

The binder improves binding properties of the positive active material particles to each other and to a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material provides an electrode with conductivity. Any suitable, electrically conductive material may be used as a conductive material unless it causes a chemical change in the battery or a component of the battery. Examples of the conductive material include a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

The negative electrode 112 includes a current collector and a negative active material layer disposed on the current collector.

The current collector may be a copper foil, but is not limited thereto.

The negative active material layer includes a negative active material, a binder and, optionally, a conductive material.

The negative active material may include a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions may include a carbon material. The carbon material may be any suitable carbon-based negative active material generally-used in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon (carbon fired at a low temperature), a hard carbon, a mesophase pitch carbonization product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ (0<x<2), a Si—C composite, a Si-Q alloy (wherein Q is an alkali metal, an alkaline-earth metal, Group 13 to Group 16 elements, a transition metal, a rare earth element, or a combination thereof, and not Si), Sn, $SnO_2$, a Sn—C composite, Sn—R (wherein R is an alkali metal, an alkaline-earth metal, Group 13 to Group 16 elements, a transition metal, a rare earth element, or a combination thereof, and not Sn), or the like. At least one of these materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, or the like.

The binder improves binding properties of negative active material particles with one another and with the current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material is included to improve electrode conductivity. Any suitable, electrically conductive material may be used as a conductive material unless it causes a chemical change in the battery or a component of the battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver and the like; a conductive polymer such as a polyphenylene derivative; or a mixture thereof.

The negative electrode may be manufactured by mixing the negative active material, the binder and the conductive material in a solvent to prepare a negative active material composition, and coating the negative active material composition on the current collector. Herein, the solvent may be N-methylpyrrolidone, or the like, and/or an aqueous solvent such as water or the like may be used according to the kind of the binder, but the solvent is not limited thereto.

The electrolyte solution includes a non-aqueous organic solvent and a lithium salt.

The non-aqueous organic solvent serves as a medium for transmitting ions taking part in the electrochemical reaction of the battery. The non-aqueous organic solvent may be selected from a carbonate-based, ester-based, ether-based, ketone-based, alcohol-based and aprotic solvent.

The carbonate-based solvent may be, for example dimethyl carbonate (DMC), diethyl carbonate (DEC), dipropyl carbonate (DPC), methylpropyl carbonate (MPC), ethyipropyl carbonate (EPC), ethylmethyl carbonate (EMC), ethylene carbonate (EC), propylene carbonate (PC), butylene carbonate (BC), or the like.

For example, when the carbonate-based solvent is prepared by mixing a cyclic carbonate and a linear carbonate, a solvent having a low viscosity while having an increased dielectric constant may be obtained. The cyclic carbonate and the linear carbonate may be mixed together in a volume ratio of about 1:1 to 1:9. The ester-based solvent may include, for example, methyl acetate, ethyl acetate, n-propyl acetate, dimethyl acetate, methyl propionate, ethyl propionate, γ-butyrolactone, decanolide, valerolactone, mevalonolactone, caprolactone, or the like.

The ether-based solvent may include, for example, dibutylether, tetraglyme, diglyme, dimethoxyethane, 2-methyltetrahydrofuran, tetrahydrofuran, and the like, and the ketone-based solvent may include cyclohexanone, or the like. The alcohol-based solvent may include ethanol, isopropyl alcohol, or the like.

The non-aqueous organic solvent may be used singularly or in a mixture. When the organic solvent is used in a mixture, the mixture ratio can be controlled in accordance with a desirable battery performance.

The non-aqueous electrolyte solution may further include an overcharge-inhibiting additive such as ethylene carbonate, pyrocarbonate, or the like.

The lithium salt dissolved in the non-aqueous organic solvent supplies lithium ions in the battery, and operates a basic operation of a rechargeable lithium battery and improves lithium ion transportation between positive and negative electrodes.

Examples of the lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$ (lithium bis(oxalato)borate; LiBOB), and a mixture or combination thereof.

The lithium salt may be used at a concentration of about 0.1 M to about 2.0 M. When the lithium salt is included at the above concentration range, the electrolyte solution may have excellent performance and lithium ion mobility due to appropriate conductivity and viscosity of the electrolyte solution.

Hereinafter, embodiments of the present disclosure are illustrated in more detail with reference to examples. However, these examples are exemplary, and the present disclosure is not limited thereto. Furthermore, what is not described in this disclosure may be sufficiently understood by those who have knowledge in this field and will not be illustrated here.

Manufacture of Acryl-Based Copolymer Synthesis Example 1

An acrylic-based copolymer was prepared by polymerizing sodium acrylate and acrylonitrile in a weight ratio of 50:50 according to the following method. Viscosity of the acrylic-based copolymer was 3,851 cps. Herein, the viscosity was measured at 62 spindles and 5 rpm by using a Brookfield viscosity meter. In addition, a reference solvent for measuring the viscosity was mineral oil (KS1000 & 5000) as a viscosity-based standard solution for correction.

For example, a reaction solution was prepared by mixing 363 g of distilled water with 62.4 g of a 20% sodium hydroxide aqueous solution and then, adding 25 g (0.347 mol) of acrylic acid, 25 g (0.471 mol) of acrylonitrile and 0.29 g (0.00126 mol) of ammonium persulfate thereto. The reaction solution was reacted for 4 hours by increasing the temperature up to 80° C., while the heating was controlled at a temperature of 65° C. to 70° C. Subsequently, the reaction solution was cooled down at room temperature, and a 20% sodium hydroxide aqueous solution was used to adjust the pH of the reaction solution to 7 to 8. 2 ml of the reaction solution was taken to measure the non-volatile components therein, and the result was 11.4% (a theoretical value of 12%).

Synthesis Example 2

An acrylic-based copolymer was prepared by polymerizing sodium acrylate and acrylonitrile in a weight ratio of 40:60 according to the following method. Viscosity of the acrylic-based copolymer was 4,457 cps.

The acrylic-based copolymer was prepared according to the same method as described in Synthesis Example 1 except for preparing a reaction solution by mixing 456 g of distilled water and 52.7 g of a 20% sodium hydroxide aqueous solution and then, adding 20 g (0.278 mol) of acrylic acid, 30 g (0.565 mol) of acrylonitrile and 0.29 g (0.00126 mol) of ammonium persulfate thereto. Non-volatile components in the reaction solution were measured, and the result was 9.3% (a theoretical value of 10%).

Synthesis Example 3

An acrylic-based copolymer was prepared by polymerizing sodium methacrylate and acrylonitrile in a weight ratio of 50:50. Viscosity of the acrylic-based copolymer was 5,127 cps.

The acrylic-based copolymer was prepared according to the same method as described in Synthesis Example 1 except for preparing a reaction solution by mixing 362 g of distilled water and 55.2 g of a 20% sodium hydroxide aqueous solution and then, adding 25 g (0.290 mol) of methacrylic acid, 25 g (0.471 mol) of acrylonitrile and 0.348 g (0.00168 mol) of ammonium persulfate thereto. Non-volatile components in the reaction solution were measured, and the result was 12.0% (a theoretical value of 12%).

Synthesis Example 4

An acrylic-based copolymer was prepared by polymerizing sodium methacrylate and methacrylonitrile in a weight ratio of 50:50 according to the following method. Viscosity of the acrylic-based copolymer was 5,760 cps.

The acrylic-based copolymer was prepared according to the same method as described in Synthesis Example 1 except for preparing a reaction solution by mixing 362 g of distilled water and 55.2 g of a 20% sodium hydroxide aqueous solution and then, adding 25 g (0.290 mol) of methacrylic acid, 25 g (0.373 mol) of methacrylonitrile and 0.30 g (0.00133 mol) of ammonium persulfate thereto. Non-volatile components in the reaction solution were measured, and the result was 12.0% (a theoretical value of 12%).

Manufacture of Separator

Example 1

2.76 wt % of polyvinyl alcohol (KL-118, KURARAY Co., Ltd.) and 97.24 wt % of distilled water were mixed to obtain a binder solution. In addition, 34.7 wt % of AlO(OH), 0.4 wt % a dispersing agent containing 40% of a non-volatile component (CERASPERSE 5468CF, SANNOPCO Co., Ltd.) and 64.9 wt % of distilled water were mixed with a bead mill, obtaining an inorganic solution.

15.6 wt % of the acrylic-based copolymer according to Synthesis Example 1, 3.4 wt % of the binder solution and 81.0 wt % of the inorganic solution were mixed, preparing a slurry. The slurry included a non-volatile component of 30 wt %.

The slurry was coated to form a 3 μm-thick coating layer on the cross-section of an 11 μm-thick polyethylene single film, manufacturing a separator. Herein, the acrylic-based copolymer and the polyvinyl alcohol were included in a weight ratio of 95:5 based on a non-volatile component in the coating layer.

Example 2

A binder solution was prepared by mixing 2.76 wt % of polyvinyl alcohol (KL-118, KURARAY Co., Ltd.) and 97.24 wt % of distilled water. In addition, an inorganic solution was prepared by mixing 35.8 wt % of AlO(OH), 0.4 wt % of a dispersing agent containing 40% of a non-volatile component (CERASPERSE 5468CF, SANNOPCO Co., Ltd.) and 63.8 wt % of distilled water with a bead mill.

14.8 wt % of the acrylic-based copolymer according to Synthesis Example 1, 6.8 wt % of the binder solution and 78.4 wt % of the inorganic solution were mixed, preparing a slurry. The slurry included a non-volatile component of 30 wt %.

The slurry was coated to form a 3 μm-thick coating layer on an 11 μm-thick polyethylene single film, manufacturing a separator. Herein, the acrylic-based copolymer and the polyvinyl alcohol were mixed in a weight ratio of 90:10 based on a non-volatile component in the coating layer.

Example 3

A binder solution was prepared by mixing 2.76 wt % of polyvinyl alcohol (KL-118, KURARAY Co., Ltd.) and 97.24 wt % of distilled water. In addition, an inorganic solution was prepared by mixing 37.0 wt % of AlO(OH), 0.5 wt % of a dispersing agent containing 40% of a non-volatile component (CERASPERSE 5468CF, SANNOPCO Co., Ltd.), and 62.5 wt % of distilled water with a bead mill.

14.0 wt % of the acrylic-based copolymer according to Synthesis Example 1, 10.2 wt % of the binder solution and 75.8 wt % of the inorganic solution were mixed to prepare a slurry. The slurry included a non-volatile component of 30 wt %.

The slurry was coated to form a 3 μm-thick coating layer on an 11 μm-thick polyethylene single film. Herein, the acrylic-based copolymer and the polyvinyl alcohol were included in a weight ratio of 85:15 based on a non-volatile component in the coating layer.

Example 4

A binder solution was prepared by mixing 2.76 wt % of polyvinyl alcohol (KL-118, KURARAY Co., Ltd.) and 97.24 wt % of distilled water. In addition, an inorganic solution was prepared by mixing 36.2 wt % of AlO(OH), 0.5 wt % of a dispersing agent containing 40% of a non-volatile component (CERASPERSE 5468CF, SANNOPCO Co., Ltd.) and 63.3 wt % of distilled water with a bead mill.

19.2 wt % of the acrylic-based copolymer according to Synthesis Example 2, 3.4 wt % of the binder solution and 77.4 wt % of the inorganic solution were mixed to prepare a slurry. The slurry included a non-volatile component of 30 wt %.

The slurry was coated to form a 3 μm-thick coating layer on the cross-section of an 11 μm-thick polyethylene single film, manufacturing a separator. Herein, the acrylic-based copolymer and the polyvinyl alcohol were included in a weight ratio of 95:5 based on a non-volatile component in the coating layer.

Example 5

A binder solution was prepared by mixing 2.76 wt % of polyvinyl alcohol (KL-118, KURARAY Co., Ltd.) and 97.24 wt % of distilled water. In addition, an inorganic solution was prepared by mixing 34.3 wt % of AlO(OH), 0.4 wt % of a dispersing agent containing 40% of a non-volatile component (CERASPERSE 5468CF, SANNOPCO Co., Ltd.) and 65.3 wt % of distilled water with a bead mill.

14.8 wt % of the acrylic-based copolymer according to Synthesis Example 3, 3.4 wt % of the binder solution and 81.8 wt % of the inorganic solution were mixed, preparing a slurry. The slurry included a non-volatile component of 30 wt %.

The slurry was coated to form a 3 μm-thick coating layer on the cross-section of an 11 μm-thick polyethylene single film, manufacturing a separator. Herein, the acrylic-based copolymer and the polyvinyl alcohol were included in a weight ratio of 95:5 based on a non-volatile component in the coating layer.

Example 6

A binder solution was obtained by mixing 2.76 wt % of polyvinyl alcohol (KL-118, KURARAY Co., Ltd.) and 97.24 wt % of distilled water. In addition, an inorganic solution was prepared by mixing 34.3 wt % of AlO(OH), 0.4 wt % of a dispersing agent containing 40% of a non-volatile component (CERASPERSE 5468CF, SANNOPCO Co., Ltd.) and 65.3 wt % of distilled water with a bead mill.

14.8 wt % of the acrylic-based copolymer according to Synthesis Example 4, 3.4 wt % of the binder solution and 81.8 wt % of the inorganic solution were mixed, preparing a slurry. The slurry included a non-volatile component of 30 wt %.

The slurry was coated to form a 3 μm-thick coating layer on the cross-section of an 11 μm-thick polyethylene single film, manufacturing a separator. Herein, the acrylic-based copolymer and the polyvinyl alcohol were included in a weight ratio of 95:5 based on a non-volatile component in the coating layer.

Comparative Example 1

A binder solution was prepared by mixing 4.9 wt % of polyvinyl alcohol (PVA217, KURARAY Co., Ltd.) and 95.1 wt % of distilled water. In addition, an inorganic solution was prepared by mixing 45.5 wt % of AlO(OH), 0.5 wt % of a dispersing agent containing 40% of a non-volatile component (CERASPERSE 5468CF, SANNOPCO Co., Ltd.) and 54.0 wt % of distilled water with a bead mill.

38.3 wt % of the binder solution and 61.7 wt % of the inorganic solution were mixed, preparing a slurry. The slurry included a non-volatile component of 30 wt %.

The slurry was coated to form a 3 μm-thick coating layer on the cross-section of an 11 μm-thick polyethylene single film, manufacturing a separator.

(Manufacture of Rechargeable Lithium Battery Cell)

$LiCoO_2$, polyvinylidene fluoride and carbon black in a weight ratio of 97:1.5:1.5 were added to an N-methylpyrrolidone (NMP) solvent, preparing a slurry. The slurry was coated on an aluminum (Al) thin film and then, dried and compressed, thereby manufacturing a positive electrode.

On the other hand, another slurry was prepared by mixing graphite, a styrene-butadiene rubber and carbon black in a weight ratio of 98:1:1 into an N-methylpyrrolidone (NMP) solvent. The slurry was coated on a copper foil and then, dried and compressed, thereby manufacturing a negative electrode.

An electrolyte solution was prepared by mixing ethylene carbonate (EC), ethylmethyl carbonate (EMC) and diethyl carbonate (DEC) to a volume ratio of 3:5:2 and adding 1 M $LiPF_6$ to the mixed solvent.

Each of the separators according to Examples 1 to 6 and Comparative Example 1 was used with positive and negative electrodes and an electrolyte solution prepared as described above to thereby manufacture a rechargeable lithium battery cell.

Evaluation 1: Thermal Shrinkage Ratio of Separator

Thermal shrinkage ratio of each separator according to Examples 1 to 6 and Comparative Example 1 was measured, and the results are provided in the following Table 1.

Each separator sample was cut into a size of 10 cm×10 cm, allowed to stand in a convection oven set at 130° C. for one hour, and then, its shrinkage ratio about MD (length direction) and TD (width direction) was measured. The shrinkage ratio was calculated according to the following Equation 1.

$$\text{Shrinkage ratio (\%)}=[(L0-L1)/L0]\times 100 \qquad \text{Equation 1}$$

In Equation 1, L0 indicates the initial length of the separator, and L1 indicates the length of the separator after being allowed to stand at 130° C. for 1 hour.

Evaluation 2: Air Permeability of Separator

Air permeability of each separator according to Examples 1 to 6 and

Comparative Example 1 was measured according to the following method, and the results are provided in the following Table 1.

The separator was cut into a size of 6 cm*6 cm, and its air permeability was measured by using a gurley densometer. The air permeability was obtained by injecting 100 cc of air into the cut separator with a set or predetermined pressure and measuring how long it took for the air to completely pass the pores of the separator.

Evaluation 3: Rupture Test of Separator

A rupture test of the separators according to Examples 1 to 6 and Comparative Example 1 was performed according to the following method, and the results are provided in the following Table 1.

Each separator was cut to a size of 5 cm×5 cm and was fixed in a paper frame with an imide tape and then, heated up to 220° C. in an oven and maintained therein for 10 minutes, and then, its shape was examined. Herein, when the separator maintained its shape, it was classified into PASS, while when the separator was broken or contracted, it was classified into FAIL.

Evaluation 4: Moisture Content of Separator

Moisture content in the coating layer of each of the separators according to Examples 1 to 6 and Comparative Example 1 was measured according to the following method, and the results are provided in the following Table 1.

The moisture content was measured by using a 860 KF Karl fischer-moisture tester (Karl fischer 860 KF thermoprep) and a 831 KF coulometer. The moisture content was obtained by putting a separation membrane in a vial, fixing the vial in the moisture tester (thermoprep), performing a measurement while the vial was maintained at 150° C. for 600 seconds, and converting the measurement into ppm. However, the measurement was performed until the moisture content change dropped down to less than or equal to 3 μg/min after the 600 seconds.

TABLE 1

| | Shrinkage ratio (%) (130° C., 1 hr) | | Air permeability | Rupture test (220° C., | Moisture content |
|---|---|---|---|---|---|
| | MD | TD | (sec/100 cc) | 10 min) | (ppm) |
| Example 1 | 1.33 | 1.0 | 129 | Pass | 323 |
| Example 2 | 2.0 | 1.5 | 136 | Pass | 377 |
| Example 3 | 2.0 | 1.67 | 141 | Pass | 406 |
| Example 4 | 1.67 | 1.5 | 131 | Pass | 292 |
| Example 5 | 2.5 | 2.0 | 137 | Pass | 356 |
| Example 6 | 2.5 | 2.33 | 145 | Pass | 342 |
| Comparative Example 1 | 8.5 | 7.5 | 207 | Fail | 953 |

Referring to Table 1, the separators of Examples 1 to 6 including a coating layer formed by using an acrylic-based copolymer and a polyvinyl alcohol-based compound as a binder exhibited a low thermal shrinkage ratio, excellent air permeability and a small moisture content in the coating layers and neither shrunk nor ruptured as compared with the separator of Comparative Example 1. Accordingly, a rechargeable lithium battery having excellent thermal stability may be realized by using a separator according to embodiments of the present disclosure.

Evaluation 5: Cycle-Life Characteristics of Rechargeable Lithium Battery Cell

Figure 2:
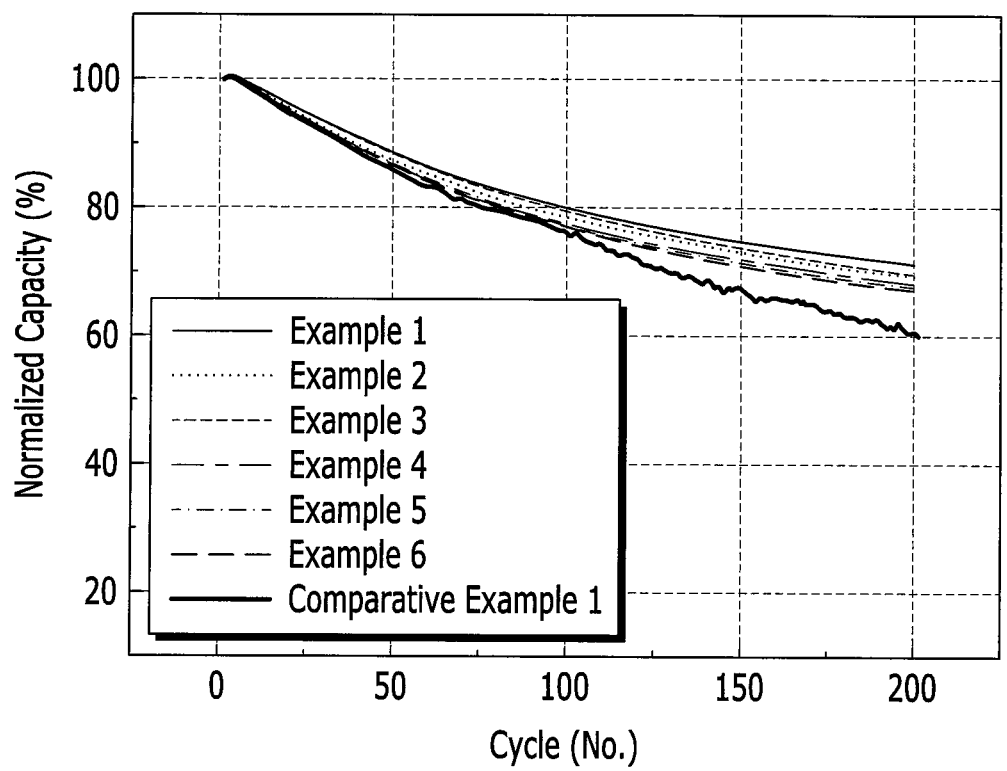
FIG. 2 is a graph showing cycle-life characteristics of rechargeable lithium battery cells according to Examples 1 to 6 and Comparative Example 1 depending on cycle repetition.

The rechargeable lithium battery cells of Examples 1 to 6 and Comparative Example 1 were charged and discharged according to the following method, their cycle-life characteristics were evaluated, and the results are provided in FIG. 2.

The charge was performed under a constant current, constant voltage (CC-CV) mode at 4.3 V and 1.0 C with a current cut-off of 0.05 C, the discharge was performed under a CC-mode at 3.0 V and 1.0 C, and the charge and discharge were repeated 200 times in total.

FIG. 2 is a graph showing cycle-life characteristics of the rechargeable lithium battery cells including the respective separators according to Examples 1 to 6 and Comparative Example 1 depending on the cycle repetition.

Referring to FIG. 2, the cells respectively including a separator having a coating layer formed of an acrylic-based copolymer and a polyvinyl alcohol-based compound as a binder according to Examples 1 to 6 exhibited excellent cycle-life characteristics as compared with the cell including a separator according to Comparative Example 1.

While this disclosure has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

100: rechargeable lithium battery
112: negative electrode
113: separator
114: positive electrode
120: battery case
140: sealing member

What is claimed is:

1. A separator for a rechargeable lithium battery comprising:
    a substrate; and
    a coating layer on at least one side of the substrate,
    the coating layer comprising a polyvinyl alcohol-based compound and an acryl-based copolymer, wherein the polyvinyl alcohol-based compound is cross-linked with the acryl-based copolymer,
    wherein the acryl-based copolymer consists of a (meth)acrylate salt-based structural unit and a (meth)acrylonitrile-based structural unit, and
    wherein the coating layer comprises about 75 to about 99.5 wt % of the acryl-based copolymer and about 0.5 to about 25 wt % of the polyvinyl alcohol-based compound, based on the total weight of the coating layer.

2. The separator for a rechargeable lithium battery of claim 1, wherein the (meth)acrylate salt comprises an alkali metal, an alkaline-earth metal, ammonium, an amine salt, or a mixture thereof.

3. The separator for a rechargeable lithium battery of claim 1, wherein the acryl-based copolymer is formed by polymerization of about 30 to about 90 wt % of the (meth)acrylate salt and about 10 to about 70 wt % of the (meth)acrylonitrile, based on the total weight of the (meth)acrylate salt and the (meth)acrylonitrile.

4. The separator for a rechargeable lithium battery of claim 1, wherein the acryl-based copolymer has a viscosity of about 500 cps to about 10,000 cps.

5. The separator for a rechargeable lithium battery of claim 1, wherein the polyvinyl alcohol-based compound comprises polyvinyl alcohol, modified polyvinyl alcohol, or a mixture thereof.

6. The separator for a rechargeable lithium battery of claim 1, wherein the coating layer further comprises an inorganic particle,
    wherein the inorganic particle comprises $SiO_2$, $Al_2O_3$, $Al(OH)_3$, $AlO(OH)$, $TiO_2$, $BaTiO_2$, $ZnO_2$, $Mg(OH)_2$, MgO, Ti(OH)$_4$, aluminum nitride (AlN), silicon carbide(SiC), boron nitride (BoN), clay, a glass powder, or a mixture thereof.

7. The separator for a rechargeable lithium battery of claim 6, wherein the coating layer further comprises a dispersing agent,
wherein the dispersing agent comprises an acryl-based compound that is different from the acryl-based copolymer.

8. The separator for a rechargeable lithium battery of claim 7, wherein the dispersing agent is included in an amount of about 0.1 to about 5 parts by weight based on 100 parts by weight of the inorganic particle.

9. The separator for a rechargeable lithium battery of claim 1, wherein the coating layer has a thickness of about 1 μm to about 7 μm.

10. The separator for a rechargeable lithium battery of claim 1, wherein the separator has a shrinkage ratio of less than or equal to about 5% obtained according to the following Equation 1:

$$\text{Shrinkage ratio (\%)} = [(L0-L1)/L0] \times 100 \quad \text{Equation 1}$$

wherein, in Equation 1, L0 is the initial length of the separator, and the L1 is the length of the separator after being allowed to stand at 130° C. for 1 hour.

11. A rechargeable lithium battery comprising the separator of claim 1.

* * * * *